(12) United States Patent
Eccard (10) Patent No.: US 11,927,300 B2
(45) Date of Patent: Mar. 12, 2024

(54) MOUNTING AND LIFT APPARATUS FOR GARDEN DEVICES

(71) Applicant: Scott Eccard, Cincinnati, OH (US)

(72) Inventor: Scott Eccard, Cincinnati, OH (US)

( * ) Notice: Subject to any disclaimer, the term of this patent is extended or adjusted under 35 U.S.C. 154(b) by 0 days.

(21) Appl. No.: 17/870,326

(22) Filed: Jul. 21, 2022

(65) Prior Publication Data
US 2023/0025229 A1 Jan. 26, 2023

Related U.S. Application Data

(60) Provisional application No. 63/225,068, filed on Jul. 23, 2021.

(51) Int. Cl.
*F16M 11/28* (2006.01)

(52) U.S. Cl.
CPC ....... *F16M 11/28* (2013.01); *F16M 2200/028* (2013.01); *F16M 2200/08* (2013.01)

(58) Field of Classification Search
CPC .. F16M 11/18; F16M 11/046; F16M 2200/08; F16M 2200/028; F16M 11/28
USPC ............. 248/161, 530, 156, 162.1, 404–405, 248/346.01–346.5; 108/55.1–55.3
See application file for complete search history.

(56) References Cited

U.S. PATENT DOCUMENTS

| | | | |
|---|---|---|---|
| 3,367,632 A | 2/1968 | Vail | |
| 4,765,277 A * | 8/1988 | Bailey | E04H 12/182 248/407 |
| 4,819,584 A | 4/1989 | Rozumek | |
| 5,273,245 A * | 12/1993 | Turner | F16M 11/10 248/185.1 |
| 5,664,748 A | 9/1997 | Speece et al. | |
| 6,142,460 A * | 11/2000 | Irwin | B25B 5/10 269/37 |
| 6,401,658 B1 | 6/2002 | Teets | |
| 6,591,716 B2 * | 7/2003 | Wantz | B25B 9/00 81/176.15 |
| 7,044,066 B1 * | 5/2006 | Miller | B65D 19/44 108/55.3 |
| 7,178,772 B2 * | 2/2007 | Riker | A47G 29/1216 248/219.2 |
| 7,744,048 B1 * | 6/2010 | McKellery | F16M 11/046 248/176.1 |
| 8,720,836 B2 | 5/2014 | Hogan | |
| 10,378,680 B2 * | 8/2019 | Anderson | F16L 3/20 |
| 10,973,221 B1 * | 4/2021 | Caffrey | A01M 23/08 |

(Continued)

*Primary Examiner* — Christopher Garft
(74) *Attorney, Agent, or Firm* — Wood Herron & Evans LLP (57) ABSTRACT

A lift apparatus and method of use thereof for securing a garden device and moving the garden device between a lowered position and a lifted position are provided. The lift apparatus broadly includes a base, a lift rod, and a universal mounting plate. The base is configured to be secured in a position on a ground surface. The lift rod is removably coupled to and extends outwardly away from the base. Further, the lift rod is configured to alternatively operate to move the garden device between the lowered position and the lifted position. The universal mounting plate is removably coupled to the lift rod at an end of the lift rod opposite that of the base. Further, the mounting plate includes engagement pins configured to interface with elongated slots to secure the garden device to the mounting plate.

19 Claims, 10 Drawing Sheets

(56) References Cited

U.S. PATENT DOCUMENTS

| | | | |
|---|---|---|---|
| 2005/0189454 A1* | 9/2005 | Smith | F16M 11/046 |
| | | | 248/127 |
| 2007/0283894 A1 | 12/2007 | Bescherer | |
| 2009/0152428 A1* | 6/2009 | Cilia | B60R 11/02 |
| | | | 248/346.03 |
| 2016/0341354 A1* | 11/2016 | Steiner | F16M 11/24 |
| 2020/0072410 A1* | 3/2020 | Ren | F16M 11/18 |
| 2021/0048142 A1* | 2/2021 | Knepple | F16B 21/04 |

* cited by examiner

MOUNTING AND LIFT APPARATUS FOR GARDEN DEVICES

CROSS-REFERENCE TO RELATED APPLICATION

This application is related to and claims priority to U.S. Provisional Patent Application Ser. No. 63/225,068, filed on Jul. 23, 2021, the entire contents of which are herein incorporated by reference.

TECHNICAL FIELD

This application relates generally to mounting apparatuses used in residential, commercial, and industrial garden spaces, and more specifically, to a mounting apparatus configured to secure various garden devices such as bird houses and bird feeders, while enabling movement of such garden devices between a lifted position and a lowered position.

BACKGROUND

Lift or mounting apparatuses are used in many aspects of home and garden maintenance. Lift apparatuses typically include a stationary base and stand at a predetermined height. Without adjustable elevation capabilities, a user may require height assistance with a ladder or step stool to safely mount a garden device on a typical lift apparatus. Some types of lift apparatuses are indeed adjustable and include a type of lifting system, either purely mechanical or electric or a combination of both. If a lift apparatus is adjustable, the lifting system is typically attached to a functional base, which then raises a device to the desired position. Lifting procedures may involve a variety of systems including clamps, balancing trays, or cage systems dedicated to specific sized devices. These lift apparatuses are useful for a variety of specific functions and technical applications. Additionally, ergonomic mounting apparatuses are desirable for elders, disabled people, and short individuals. Unfortunately, many lift apparatuses are not adjustable, are unable to reach desired elevation levels, or are limited to and/or customized for mounting only specific devices. Thus, lifting often requires additional inconvenient and bulky equipment to compensate for limited application mounting plates or risky lifting techniques not suited for personal lifting uses.

There is an absence of lift apparatuses and specifically lift apparatuses that can mount, secure in place, and adjust to various shaped objects in this field. Lift systems as described in U.S. Pat. No. 10,973,221 to Caffrey and U.S. Pat. No. 8,720,836 to Hogan address limited lifting needs. Such systems are useful for lifting and lowering specific objects, but they lack the adaptability to universally lift various weights, sizes, and shapes of objects. Niche uses can lead to dropped objects or dangerous lifting scenarios that may injure the user. Moreover, the design in the '836 Patent to Hogan is highly complex in structure and difficult to use with different types of garden devices, in view of the limitations provided on the particular mounting structure(s) provided in that reference.

As such, it would be desirable to provide an improved accessible lift apparatus for allowing users to mount and lift various garden devices to specific elevations without risking injury from bulky or unstable conventional designs. Furthermore, it would be desirable to provide such improved apparatuses that are adjustable to various shaped and sized garden devices, while also providing good ergonomics for those users who need or desire such.

SUMMARY

Certain exemplary aspects of the invention are set forth below. It should be understood that these aspects are presented merely to provide the reader with a brief summary of certain forms the invention might take and that these aspects are not intended to limit the scope of the invention. Indeed, the invention may encompass a variety of aspects that may not be explicitly set forth below.

In a first set of embodiments of the invention, a lift apparatus for securing a garden device and moving the garden device between a lowered position and a lifted position is provided. The lift apparatus includes a base configured to be secured in a position on a ground surface. The lift apparatus also includes a lift rod removably coupled to and extending outwardly away from the base. The lift rod is configured to alternatively operate to move the garden device between the lowered position and the lifted position. The lift apparatus further includes a universal mounting plate removably coupled to the lift rod at an end of the lift rod opposite of the base. The mounting plate is configured to secure the garden device to the mounting plate. The mounting plate includes a substantially planar support plate defining an upper surface configured to support the garden device. The mounting plate also includes a plurality of elongated slots extending through the support plate. Further, the mounting plate includes a plurality of engagement pins configured to interface with at least some of the plurality of elongated slots. Each engagement pin of the plurality of engagement pins is moveable so as to be adjustable in position within an elongated slot of the plurality of elongated slots and configured to be repositioned in any of the plurality of elongated slots. The plurality of engagement pins of the mounting plate secure the garden device to the upper surface of the support plate.

In one embodiment, the plurality of elongated slots may extend inwardly along linear or curved paths from an outer periphery of the support plate towards a center of the support plate. Further, each engagement pin of the plurality of engagement pins may include a rigid central pin configured to extend through the elongated slot in the support plate. Each engagement pin may also include and a spring-loaded clamp configured to be located below the support plate and removably secure the engagement pin in a position on the support plate. Additionally, each engagement pin of the plurality of engagement pins may further include an annular resilient gripping member surrounding a portion of the rigid central pin and configured to project above the upper surface of the support plate to engage with the garden device to removably secure the garden device in a position on the upper surface of the mounting plate.

In another embodiment, the lift rod may include a plurality of telescoping extending shafts arranged in a nested configuration. The lift rod may also include a drive actuator that alternatively operates to move the plurality of extending shafts between the lowered position and the lifted position. The lowered position may be an accessible position for a user on the ground surface to interact with or adjust the garden device on the mounting plate. The lifted position may be a desired mounting or viewing location for the garden device. Further, the plurality of telescoping extending shafts may include an inner telescoping shaft and an outer telescoping shaft where the outer telescoping extending shaft may move linearly relative to the inner telescoping extending shaft when actuated by the drive actuator. Additionally, the drive actuator may be operated by a switch and the switch may be operatively connected to the lift rod. Alternatively or additionally, the drive actuator may be operated by a foot pedal. The foot pedal may be operatively connected to a collar plate and the collar plate may be located a distance above the base. Further alternatively or additionally, the drive actuator may be operated by a remote control.

In yet another embodiment, the lift rod may include a neck rod extending away from the lift rod at the end of the lift rod and the mounting plate may include a neck rod extending away from a lower surface of the mounting plate. The neck rod of the lift rod may be removably coupled to the neck rod of the mounting plate. Further, the neck rod of the lift rod may be removably connected to the neck rod of the mounting plate by a push-pin or bayonet-style connection. Additionally, the neck rod of the lift rod may include a neck cap that extends over and covers a portion of the lift rod at the end of the lift rod.

In a further embodiment, the lift rod may include a neck rod extending away from the lift rod at an opposite end of the lift rod and the base may include a rod holder base extending away from the base. The neck rod of the lift rod may be removably coupled to the rod holder base of the base. Further, the neck rod of the lift rod may be removably connected to the rod holder base by a plurality of locking bolts, a push-pin connection, or a bayonet-style connection.

In one embodiment, the base may include a ground mounting stake removably secured to the base and extending outwardly away from the base in a direction opposite that of the lift rod. The ground mounting stake configured to further secure the base in the position on the ground surface.

In another set of embodiments of the invention, a method for using an accessible lift apparatus to secure a garden device and move the garden device between a lowered position and a lifted position is provided. The method includes providing the lift apparatus. The lift apparatus includes a base configured to be secured in a position on a ground surface. The lift apparatus also includes a lift rod removably coupled with the base and configured to provide linear elevation adjustment between the lowered position and the lifted position. Further, the lift apparatus includes a universal mounting plate removably coupled with the lift rod on an end of the lift rod opposite of the base. The mounting plate is configured for securing garden devices of varying size and shape configurations using a plurality of engagement pins. The method also includes removably securing the garden device to the mounting plate. Further, the method includes adjusting a height of the mounting plate by extending the lift rod to the lifted position or retracting the lift rod to the lowered position.

In one embodiment, the mounting plate may include a substantially planar support plate defining an upper surface and configured to support the garden device. Further, the mounting plate may include a plurality of elongated slots extending through the support plate. The plurality of engagement pins may be inserted into at least some of the plurality of elongated slots. Further, the method step of removably securing the garden device may further include adjusting the plurality of engagement pins to abut the garden device.

In another embodiment, the lift rod may include a drive actuator, an inner telescoping shaft, and an outer telescoping shaft. The inner telescoping shaft and the outer telescoping shaft may separate from a nested configuration when moved by the drive actuator to thereby extend an overall length of the lift rod. Further, the method step of adjusting the height of the mounting plate may further include actuating the drive actuator thereby moving the outer telescoping shaft linearly relative to the inner telescoping shaft. Additionally, the step of adjusting the height of the mounting plate may further include operating the drive actuator by a switch, foot pedal, or remote control configured to operate the drive actuator.

In yet another embodiment, the method may further include removably securing the base to the ground surface by a ground mounting stake. The ground mounting stake may be removably secured to the base and extend outwardly away from the base in a direction opposite that of the lift rod.

BRIEF DESCRIPTION OF THE DRAWINGS

Various additional features and advantages of the invention will become more apparent to those of ordinary skill in the art upon review of the following detailed description of one or more illustrative embodiments taken in conjunction with the accompanying drawings and pictorial views. The accompanying drawings and pictorial views, which are incorporated in and constitute a part of this specification, illustrate one or more embodiments of the invention and, together with the general description given above and the detailed description given below, serve to explain the one or more embodiments of the invention.

DETAILED DESCRIPTION

The exemplary embodiments described herein are provided for illustrative purposes and are not limiting. Other exemplary embodiments are possible, and modifications may be made to the exemplary embodiments within the scope of the present disclosure. Therefore, this Detailed Description is not meant to limit the scope of the present disclosure.

With reference to FIGS. 1-8, an accessible lift apparatus 10 in accordance with embodiments of the invention is shown. As set forth in further detail below, the accessible lift apparatus 10 addresses the need for lower elevation access and automatic raising and lowering to accommodate shorter people, handicapped people, elderly people, and children. The accessible lift apparatus 10 ergonomically allows a user to secure a garden device 12 of varying shapes and sizes using a universal mounting plate 14, lift the secured garden device 12 using a lift rod 16, and then adjust the mounting height to a desired elevation level using the lift rod 16. Consequently, a user may lift and mount garden devices without risking injury from overreaching to lift a garden device above the user's height level or balancing a garden device on a mounting platform without a securement method.

The lift apparatus 10 of the embodiments described herein can reach high elevation while still securely lifting any garden device 12 such as flowerpots, bird baths, bird houses, or garden sculptures. Customized elevation setting and adjustment allows the garden device 12 to reach specific elevations called for in landscaping design plans; to avoid ground animals that may interfere with the garden device 12 such as deer, bears, or squirrels; and to lift the garden device 12 to specific heights for its intended purpose such as elevated for bird access. By contrast, traditional garden device lifting apparatuses offer limited height customization for mounted garden devices. No matter the height or garden device purpose, the accessible lift apparatus 10 can lower and lift according to exact specifications whatever the user chooses to lift for their gardening needs, while also providing universal mounting for many different types of garden devices 12 and also providing an ergonomic design for users having varying capabilities and reach. The elements and features of the lift apparatus 10 are set forth in further detail below to clarify each of these functional advantages and other benefits provided in this disclosure.

Figure 1:
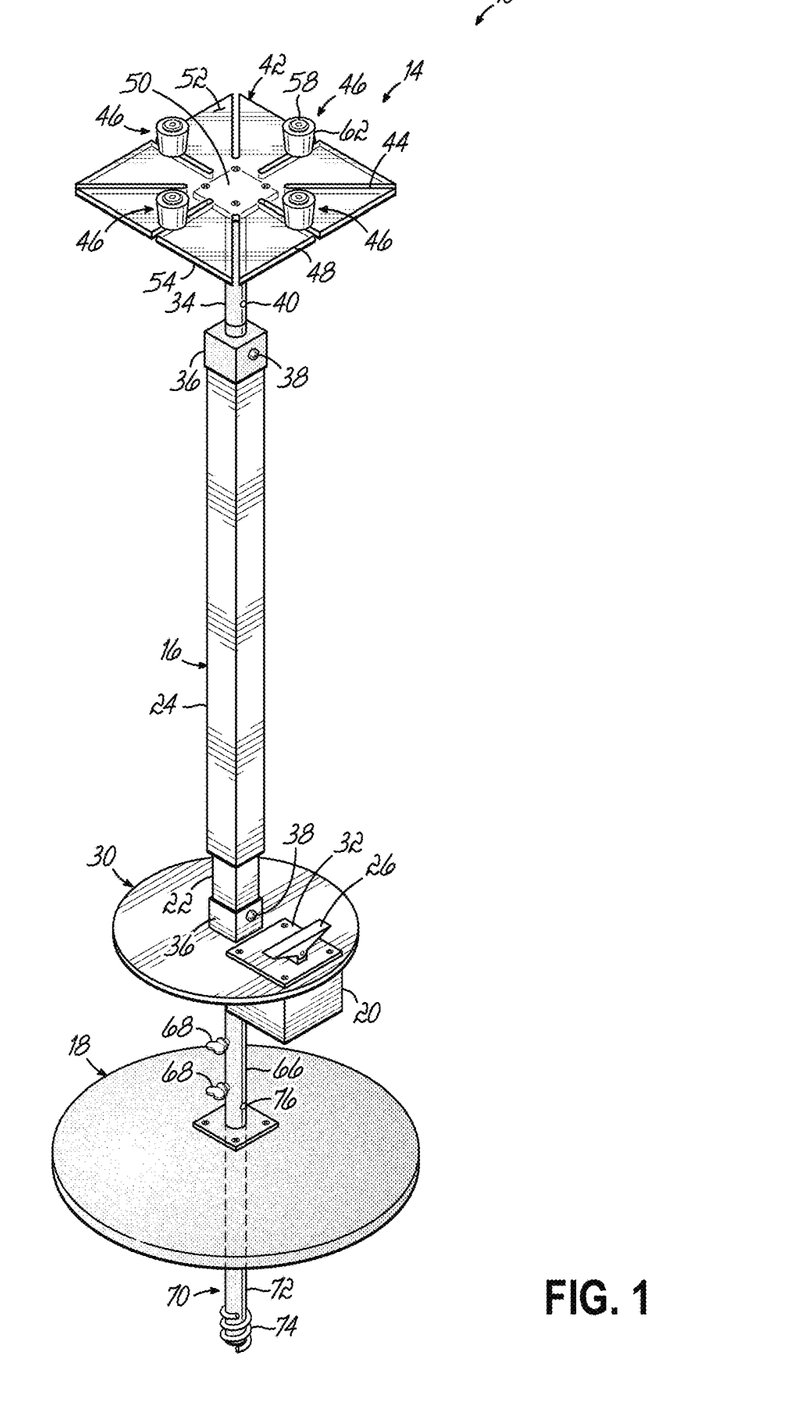
FIG. 1 is a perspective view of one embodiment of an accessible lift apparatus according to this invention, specifically shown in a lowered position.
Figure 2:
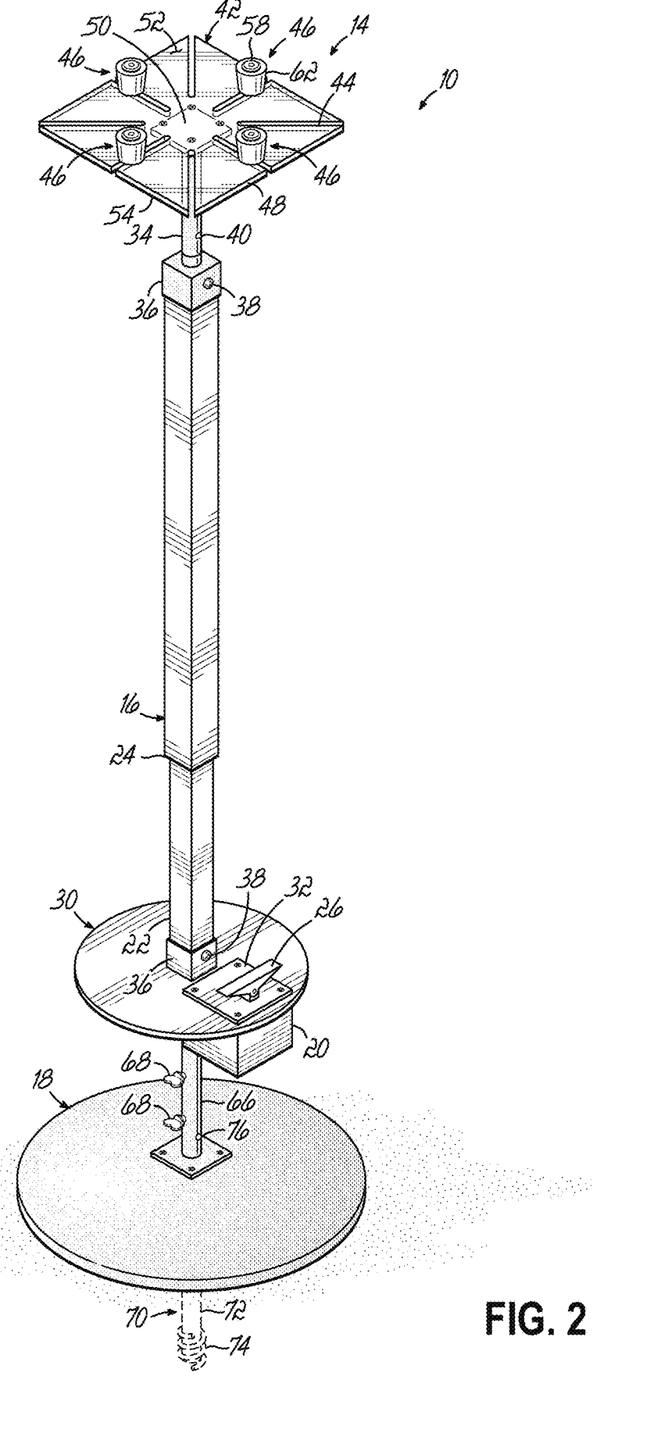
FIG. 2 is a perspective view of the accessible lift apparatus of FIG. 1 in a lifted position.
Figure 3:
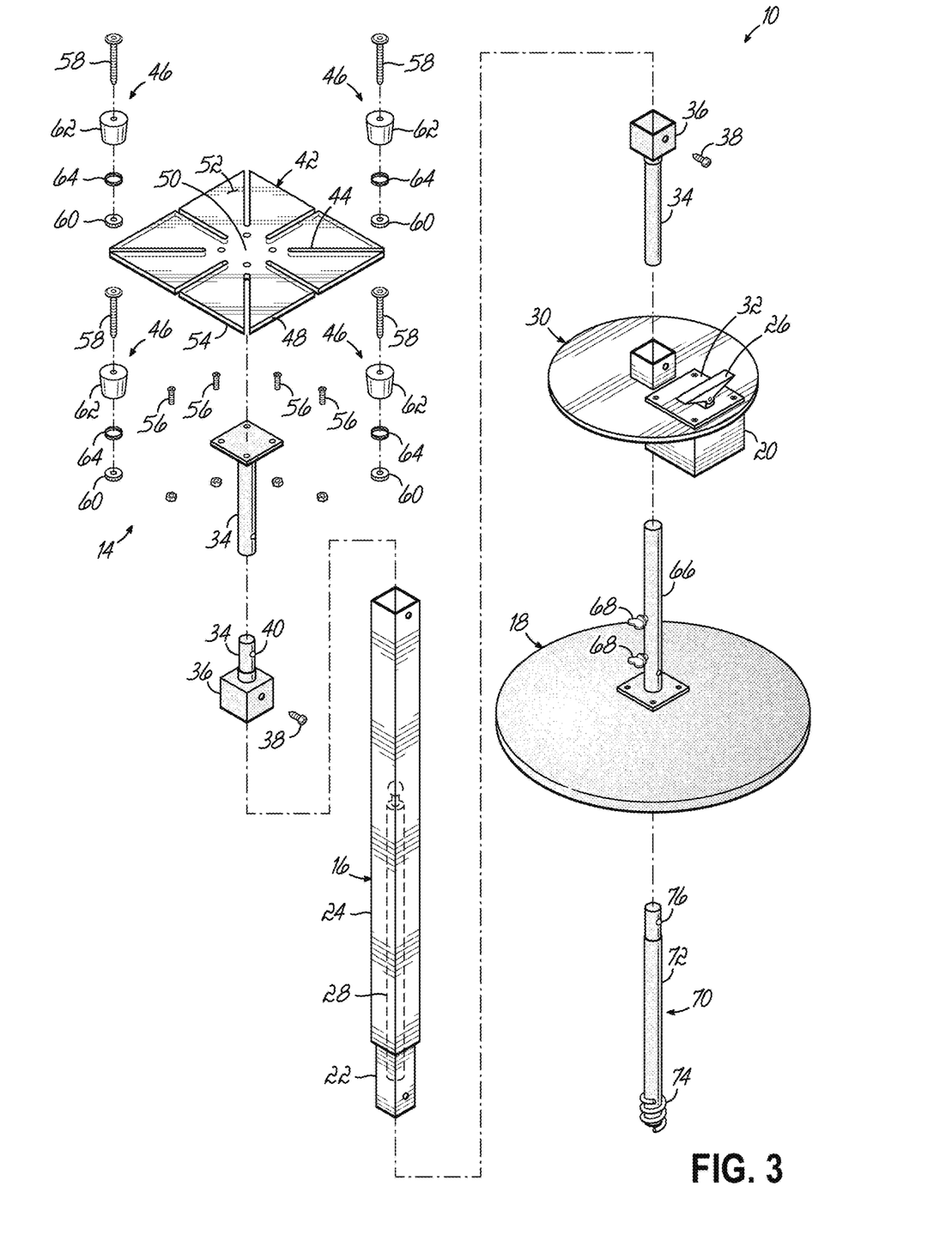
FIG. 3 is an exploded view of the accessible lift apparatus of FIG. 1.

Referring now to FIGS. 1-3, a first embodiment of the accessible lift apparatus 10 is shown. The accessible lift apparatus 10 generally includes a mounting plate 14, lift rod 16, base 18, and control box 20. In the illustrated embodiment the lift rod 16 is removably coupled at one end with the base 18 and at an opposing end with the mounting plate 14. As will be described in greater detail below, the lift rod 16 is configured to provide customizable linear elevation adjustment, and it may raise (e.g., as shown in FIG. 2) and lower (e.g., as shown in FIG. 1) garden devices 12 (shown in FIG. 4, for example) secured on the mounting plate 14 to elevations required or desired for a plurality of purposes such as heights called for in landscaping designs for aesthetics and heights required for animal feeding devices such as bird feeders.

To summarize the operation of the accessible lift apparatus 10, the lift rod 16 and the control box 20 include the capability to lower the mounting plate 14 to a comfortable position for manual manipulation and access by a user (a minimum exemplary elevation being shown in FIG. 1, for example) and then lift the mounting plate 14 to any of several desired mounting elevations (a maximum exemplary elevation being shown in FIG. 2, for example). An electromechanical system, described in greater detail below, actuates the accessible lift apparatus 10 to extend and shorten the lift rod 16 generally linearly. The lift rod 16 includes at least an inner telescoping extending shaft 22 and the outer telescoping extending shaft 24. The outer telescoping extending shaft 24 moves linearly relative to the inner telescoping extending shaft 22, lengthening or shortening the lift rod 16 and raising or lowering the mounting plate 14 to the desired elevation. When the lift apparatus 10 is lowered, the user may place a garden device 12 on the mounting plate 14 and secure the garden device 12 to the mounting plate 14 without concern for falling or dropping the garden device 12. Once the user secures the garden device 12 to the mounting plate 14, the user may actuate the lift apparatus 10 using a control switch 26 until the lift apparatus 10 reaches the desired elevation. The control switch 26 may be but is not limit to a toggle switch, sliding switch, button, lever, pedal, and/or similar.

With continued reference to FIGS. 1-3, elements related to the lift rod 16 that extends the apparatus between positions are shown. The lift rod 16 incorporates a drive actuator 28 (shown in FIG. 3) that separates the telescoping extending shafts 22, 24 from a nested configuration to an extended configuration thereby extending an overall length of the lift rod 16. In this regard, the outer telescoping extending shaft 24 moves linearly relative to the inner telescoping extending shaft 22 when actuated by the drive actuator 28 in relation with user inputs that may be provided at the control box 20 (e.g., by the control switch 26). It will be understood that more than two telescoping shaft sections may be provided in alternative embodiments consistent with the scope of this invention, with multiple such telescoping shafts being movable relative to each other in a similar manner as described above.

When actuated (e.g., by the drive actuator 28), the inner telescoping extending shaft 22 and the outer telescoping extending shaft 24 move the mounting plate 14 by lowering it to the user's height, for example, where the user may secure the garden device 12 to the mounting plate 14. Then the user may actuate (e.g., by the drive actuator 28) the accessible lift apparatus 10 to rise to a desired "in use" elevation, for example. The user may customize the lift apparatus 10 to whatever height fits the user's needs. The lift apparatus 10 thereby streamlines the mounting process by adapting to a user's height limitations and securing any size and profile of garden device 12 into position on the mounting plate 14 before lifting the garden device 12 to a desired position at an adjustable elevation.

With continued reference to FIGS. 1-3, the depicted embodiment includes a control box 20 mounted on a collar plate 30. The collar plate 30 is attached to the lift rod 16 such that a bottom surface of the collar plate 30 is coupled to the control box 20 and an upper surface of the collar plate 30 is coupled to a control switch 26—depicted as a toggle switch. A toggle plate 32 is secured to the collar plate 30 between the control switch 26 and the upper surface of the collar plate 30. The control switch 26 is therefore a foot pedal-type switch which allows for convenient control of operations of the lift apparatus 10 without requiring an operator's hands, which frees those hands up for any other needed support activities. It will be understood that multiple control switches of different types and/or a remote control may be combined in other embodiments without departing from the scope of this invention (e.g., for circumstances when the foot switch style control switch 26 is temporarily not easily accessible, such as when covered with snow and/or ice in locations with winter seasons).

When an electrical signal is produced by the control switch 26 the lift apparatus 10 raises and lowers to the user's elevation preference. The lift apparatus's 10 elevation is customizable to whatever is most comfortable to the user and wherever the user desires. In addition, the user can automatically adjust the lift apparatus's 10 elevation for better visibility at a specific height. The user may further adjust the accessible lift apparatus's 10 elevation throughout the use life to accommodate changed design aesthetics or differing periodic weather needs. For example, a user may raise the accessible lift apparatus 10 to accommodate growing greenery that may block the current position. Another example may occur when a user chooses to lower the accessible lift apparatus 10 due to wind concerns. When actuated the lift rod 16 will raise and lower as driven by the drive actuator 28. The lift rod 16 will lock in whatever position the user releases the control switch 26 and will remain in the position until the user engages the system again to change the elevation.

Referring specifically now to FIG. 3, the accessible lift apparatus 10 components are shown in further detail. As shown, the accessible lift apparatus 10 may contain detachable components for easy removal and relocation. Specifically, the lift rod 16, inner telescoping extending shaft 22, and outer telescoping extending shaft 24 mount collectively as a unit (such as with bayonet connections at top to bottom as shown in FIGS. 6A and 7A) for ease of installation and removal. The lift system may include a drive actuator 28 in the form of a battery powered electro-mechanical ball-screw type linear lift device operatively coupled to the shafts 22, 24 of the lift rod 16 and including internal gearing for achieving additional movement and/or height. In the illustrated embodiment, the accessible lift apparatus 10 can reach a height up to 15 feet with an operating speed of 0.28 inches per second when powered from a single 12 volt battery (not shown). Alternative embodiments may include alternative power sources such as solar power and alternative size specifications to accommodate additional or lower stress and strain requirements. Further, it will be appreciated that other embodiments may further include internal hydraulics, pneumatics, or mechanical drives such as pulleys for actuating the lift and lower movements.

The depicted embodiment further includes optional neck rods 34 on both ends of the lift rod 16 to help define the removable connections from the lift rod 16, to the base 18 and to the mounting plate 14. Further, the neck rod 34 at the top end of the lift apparatus 10 includes a neck cap 36, which fits over the top periphery of the outer telescoping extending shaft 24 and secures to the lift rod 16 by a main body bolt 38. This modification simplifies the manufacturing and assembly of the elements of the lift apparatus 10.

With continued reference to FIG. 3, the lift rod 16 may be removable from the mounting plate 14 by the press release pin 40. The telescoping extending shafts 22, 24 may be removed and reassembled by unscrewing the main body bolt 38. It will be appreciated that alternative lift rod 16 couplings may be used in further embodiments without departing from the scope of this invention. The depicted embodiment of the lift rod 16 as shown in the Figures is made from square cross-section 6063-T5 aluminum alloy tubing for light weight and strong construction. The tubing may be constructed out of any shaped rods and shafts including but not limited to: circular, square, rectangular, or hexagonal of varying thicknesses and widths, and it will be understood that other materials beyond aluminum may be used in other embodiments.

Figure 4:
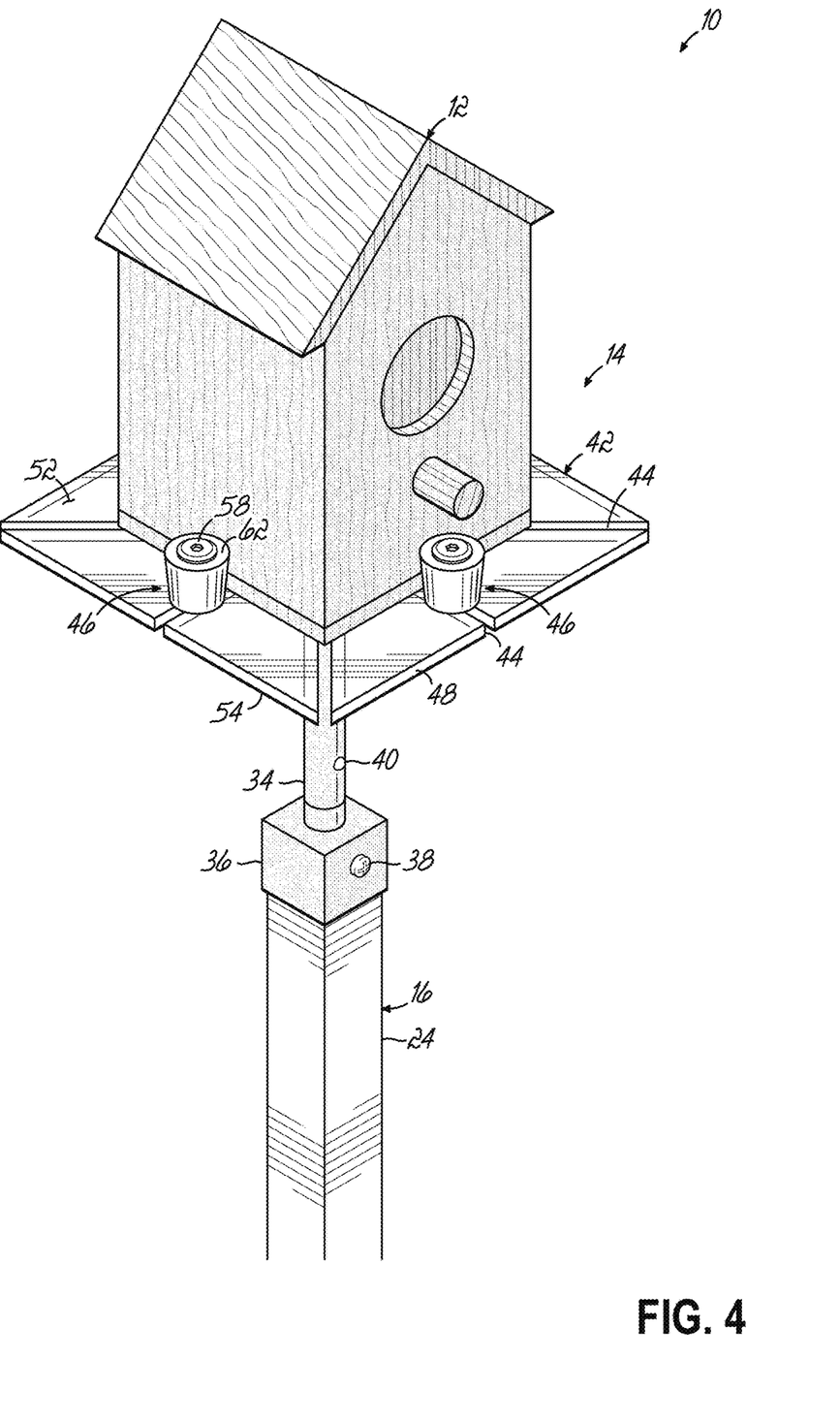
FIG. 4 is a perspective view of the mounting plate, the engagement pins, and the shaft connection point of the accessible lift apparatus of FIG. 1 with a garden device thereon.

Referring now to FIGS. 4-6A, the universal mounting plate 14 is shown. The universal mounting plate 14 can support garden devices 12 (as shown in FIG. 4, for example) of a plurality of shapes and sizes including but not limited to: flowerpots, potted plants, potters, planter box, cut flowers, pottery, baskets, vases, boxes, signs, butterfly nets, jars, candles, bug zappers, lanterns, wreaths, holiday decorations, pumpkins, party decorations, weather detection devices, garden windmills, pinwheels, statues, sculptures, yard ornaments, garden gnomes, outdoor clocks, windchimes, bird houses, bird baths, bird nests, bird feeders, nectar dispensers, small animal feeders, portable lighting fixtures, outdoor cameras, telescopes, decorative rocks, solar devices, speaker systems, tools, and other garden devices 12.

Further, as shown in FIG. 4, one or more of the main body bolts 38 and press release pin 40 secures the neck rod 34 extending downwardly from the universal mounting plate 14 to the outer telescoping extending shaft 24. In one particular example as illustrated, the neck rod 34 extending upwardly from an upper end of the outer telescoping extending shaft 24 may insert into a sleeve-like receiving structure defined by another, neck rod 34 extending downwardly from the mounting plate 14 with a removable connection therebetween being defined by the spring-loaded press release pin 40 that seats in a corresponding aperture on the other of the neck rods 34. It will be understood that the universal mounting plate 14 may also be secured to the neck rod 34 by alternative structures and connectors such as a screw-on feature or locking pins, or even a bayonet-style pin-in-slot connection (as shown in FIG. 6A, for example).

Figure 5:
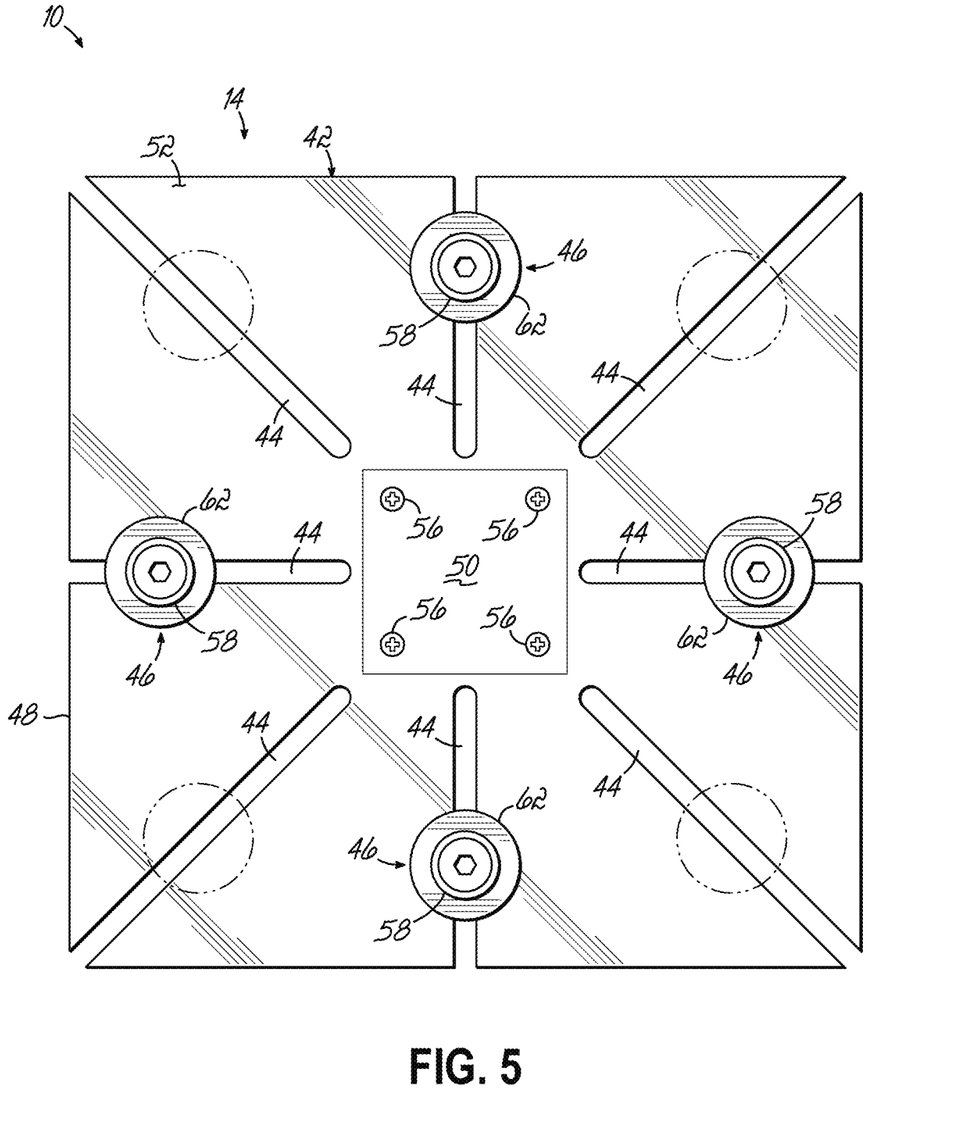
FIG. 5 is a top view of the mounting plate and engagement pins of the accessible lift apparatus of FIG. 1.
Figure 6:
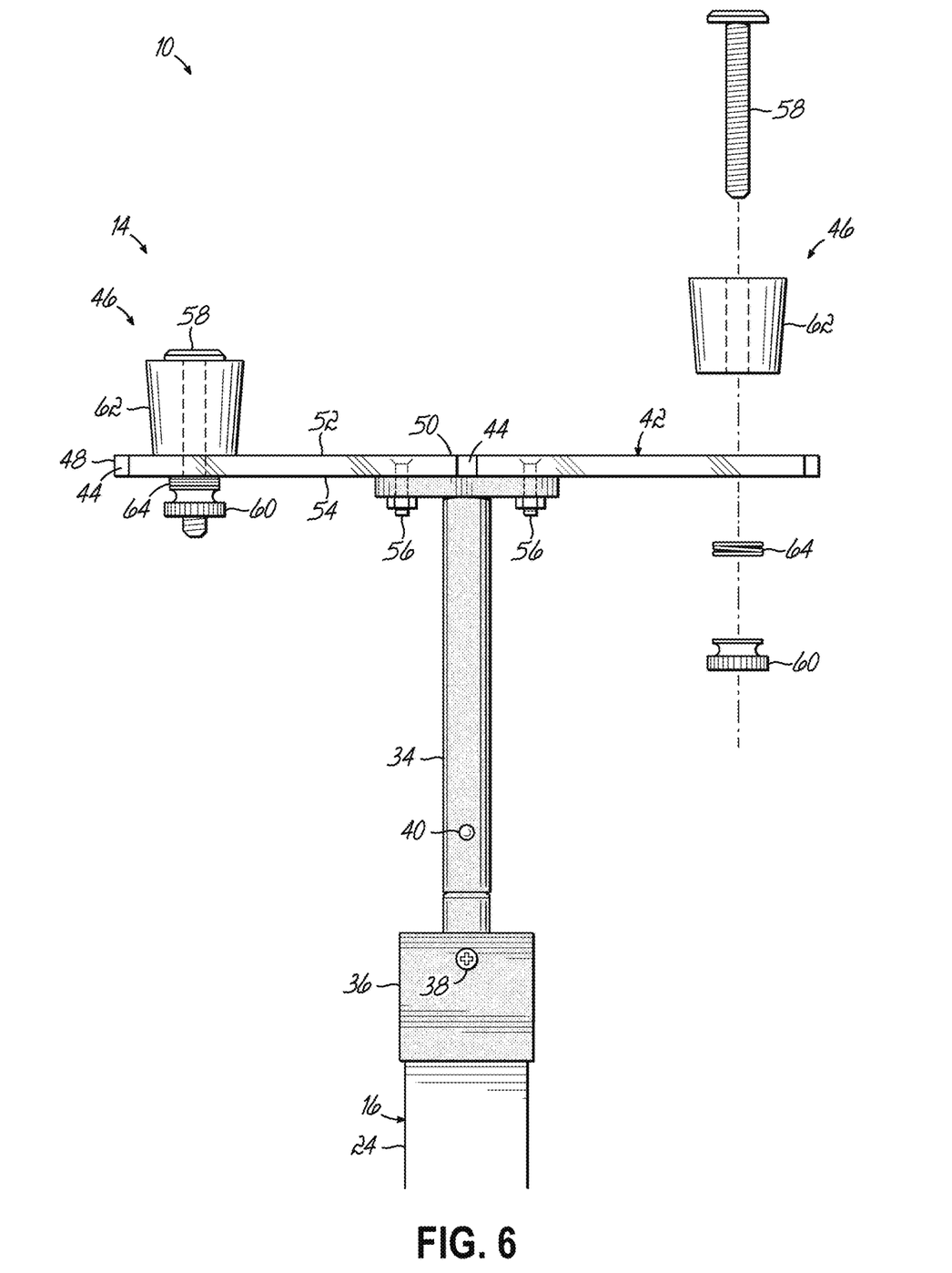
FIG. 6 is a side view of the mounting plate, the engagement pins, and the shaft connection point of the accessible lift apparatus of FIG. 1.
Figure 6A:
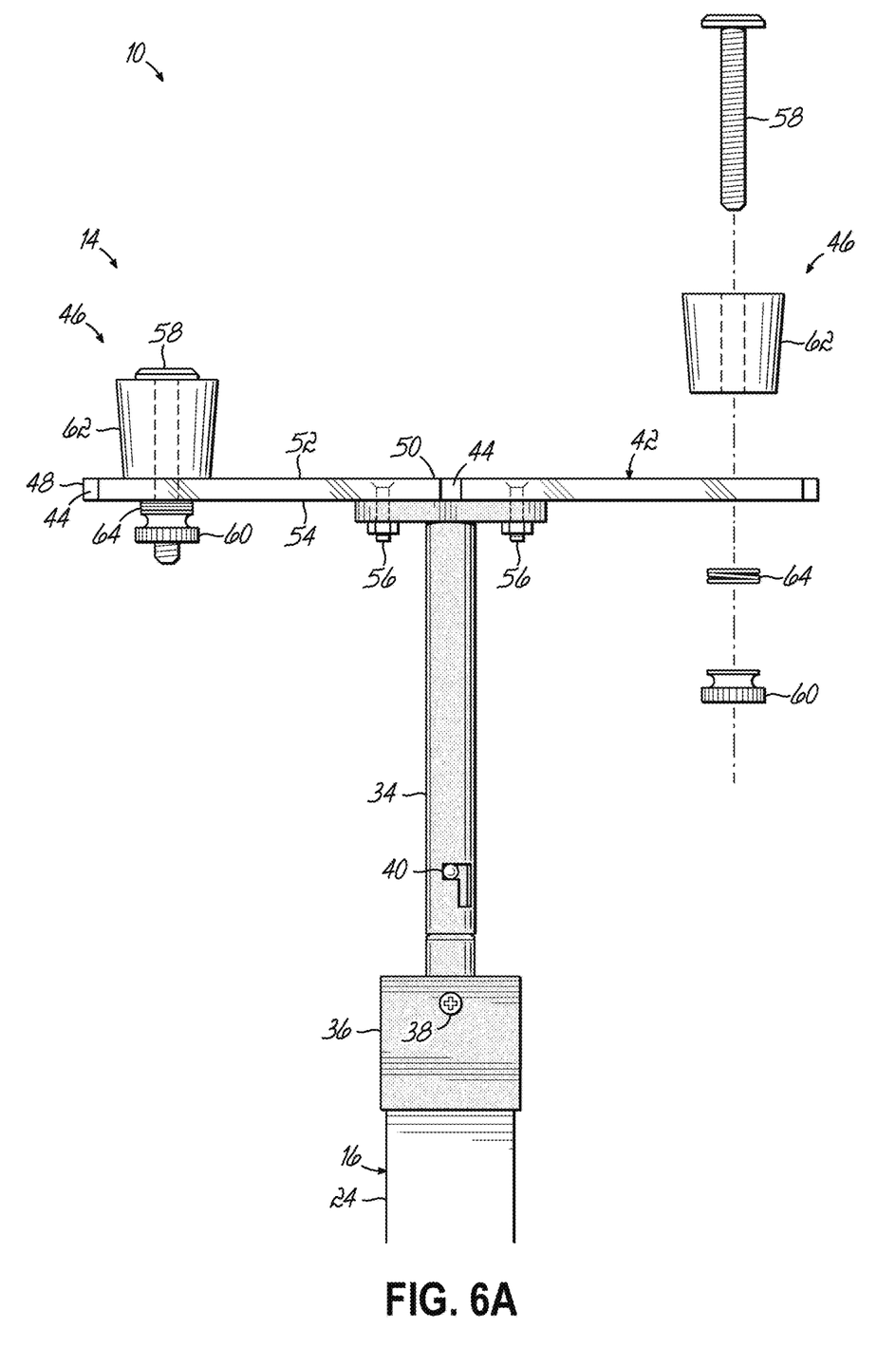
FIG. 6A is an alternative side view of the mounting plate, the engagement pins, and the shaft connection point of the accessible lift apparatus of FIG. 6, showing a bayonet-style connection.

As shown in FIGS. 5, 6, and 6A, the mounting plate 14 features a support plate 42 with a generally planar surface with elongated slots 44 and removable engagement pins 46. The depicted embodiment includes a generally square support plate 42 made of plexiglass, where the elongated slots 44 extend from an outer periphery 48 of the support plate 42 towards a center 50 of the support plate 42. Alternatively, the support plate 42 may be constructed out of different materials such as metals or lightweight stone. The elongated slots 44 extend through the mounting plate 14 from the upper surface 52 of the mounting plate 14 through to the lower surface 54 of the mounting plate 14. The center 50 of the support plate 42 in this embodiment features removable plate connection bolts 56 that secure the support plate 42 to an upper neck rod 34 generally located at the center of mass to ensure generally maximum weight allowances and balancing.

As shown in FIG. 5, the elongated slots 44 are cutout sections through the mounting plate 14 from the upper surface 52 to lower surface 54. The elongated slots 44 are provided just wide enough to fit the engagement pins 46. The elongated slots 44 are generally linear and extend from the corners and the outer periphery 48 of the mounting plate 14 towards a center 50 of the mounting plate 14. It will be understood that alternative embodiments may feature different support plates 42 of varying shapes, thicknesses, materials, and widths. Also, the elongated slots 44 can be cut to any width and path, linear or curved, depending on the embodiment construction. For example, an alternative mounting plate 14 may be made of a circular piece of wood with elongated slots 44 that are curved and extend from three evenly spaced outer periphery 48 points. The elongated slots 44 may vary in width depending upon the diameter of the engagement pins 46.

As shown in FIGS. 6 and 6A, the engagement pins 46 feature a rigid central pin 58, stop nut 60, annular resilient gripping members 62, and a spring-loaded clamp 64. The rigid central pin 58 extends through the elongated slot 44 in the mounting plate 14 with the spring-loaded clamp 64 and stop nut 60 located under the lower surface 54 of the mounting plate 14 for locking the engagement pin 46 in position on the mounting plate 14. Each engagement pin 46 further includes an annular resilient gripping member 62 surrounding a portion of the rigid central pin 58 that projects above the upper surface 52 of the mounting plate 14. The annular resilient gripping member 62 may be configured to engage with varying shapes and profiles to secure a garden device 12 to the mounting plate 14.

Each of the plurality of engagement pins 46 is moveable along the elongated slots 44. In an extended position, the spring-loaded clamp 64 allows the rigid central pin 58 to slide within the elongated slot 44. The spring-loaded clamp 64 may then be released, locking the engagement pin 46 into position and acting as a stopper. When a plurality of engagement pins 46 are positioned along the elongated slots 44, surrounding the garden device 12, the engagement pins 46 can lock the device 12 into place and prevent it from moving on the mounting plate 14. The annular resilient gripping members 62 add additional frictional force to prevent the garden device 12 from deviating from the secured position in the elongated slot 44, while also allowing for secure contact and engagement with any number of differing shapes and profiles on the outer periphery of garden device 12. Furthermore, the annular resilient gripping members 62, as illustrated in this embodiment, may be made of a rubber-like cushion material, so as to protect the garden device 12 from abrasions or scratches from the engagement pins' 46 inner, metallic components. Alternative embodiments of engagement pin 46 locking components can include ball lock pins or screw pins and such can be constructed from alternative materials.

Referring generally to FIGS. 4-6A, a plurality of engagement pins 46 will be placed within some or all of the elongated slots 44 so as to be moved to the most secure placement for engaging with the garden device 12, which may have varying shape and size specifications. Users may use multiple engagement pins 46 in a variety of profile specifications along the elongated slots 44 to ensure the most secure placement of the garden device 12. It will be understood that the engagement pins 46 are removable and may be repositioned multiple times in a variety of configurations using more or less engagement pins 46 in any subset or all of the elongated slots 44 in alternative embodiments consistent within the scope of this invention.

Figure 7:
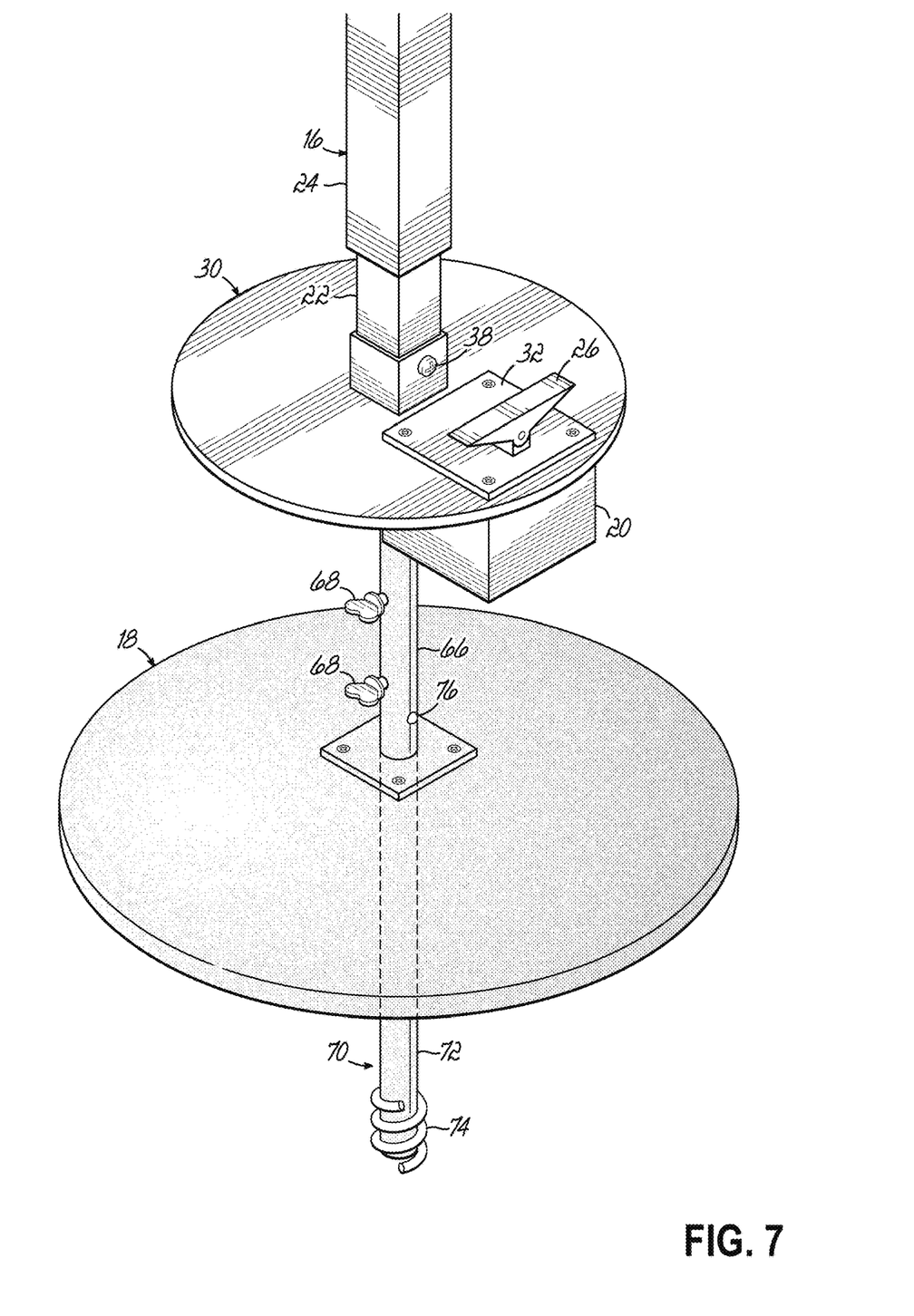
FIG. 7 is a perspective view of the base and the control box of the accessible lift apparatus of FIG. 1.
Figure 7A:
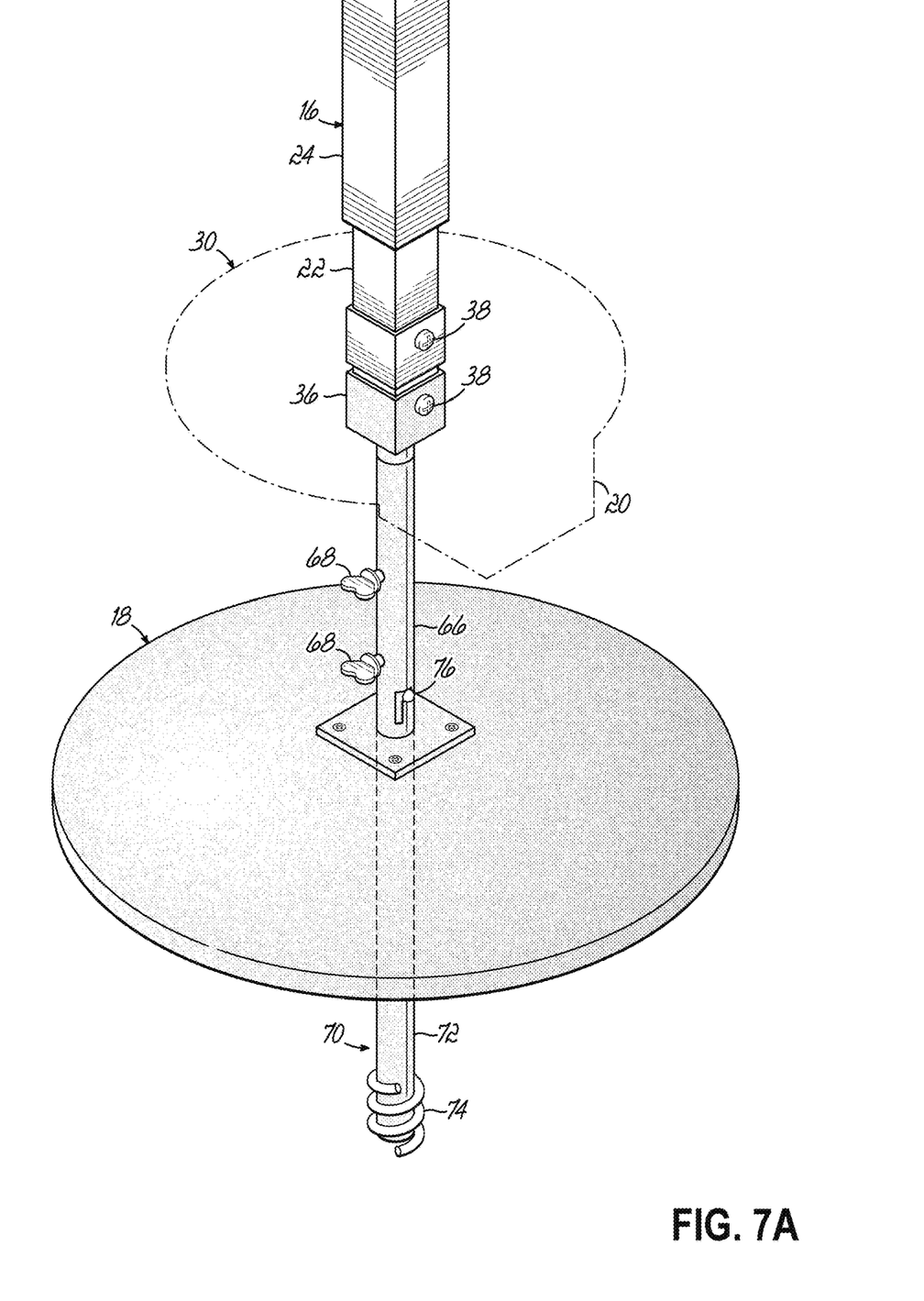
FIG. 7A is an alternative is a perspective view of the base and the control box of the accessible lift apparatus of FIG. 7, showing a bayonet-style connection.

Referring now to FIGS. 7 and 7A, an embodiment of the base 18 is now described in further detail. The base 18, made of steel in this embodiment and located at the bottom of the accessible lift apparatus 10, defines a secure in ground support. The base 18 is removably secured to the lift rod 16 through the rod holder base 66 and the releasable locking bolts 68. The rod holder base 66 may be coupled to the base 18 to form an upright sleeve-like structure rooted to the ground, although it will be understood that the rod holder base 66 can also be integrally formed as a unitary piece with the remainder of the base 18 in some embodiments, and/or connected through other joining means such as snap connections or more permeant welded joints. Specifically, in the depicted embodiment, the lower neck rod 34 extending downwardly from the bottom end of the inner telescoping extending shaft 22 is inserted into an annular sleeve defined by the rod holder base 66 and then locked in position within the rod holder base 66 by tightening the locking bolts 68 in their corresponding apertures, this securement being of a similar removable fashion as Christmas tree supports, for example. The components of the base 18 collectively ensure a strong center of gravity and stable supporting structure when balancing a garden device 12 atop the mounting plate 14 when the accessible lift apparatus 10 is fully assembled.

In an alternative embodiment shown in FIG. 7A, the removable connection between the lift rod 16 and the base 18 may instead be made by a bayonet-style pin-in-slot set of connection features provided on the neck rod 34 and on the rod holder base 66, this bayonet-style connection being quicker and easier for users to implement. This design is consistent with having each component be removable at the connection points for easy maintenance and relocation. For example, the lift rod 16 and the universal mounting plate 14 may each be individually detached for easier movement and relocation to a new position (e.g., other bases 18 may be provided at different ground locations such that the user may move a subset of lift rods 16 and mounting plates 14 to different locations as desired, such as at different times of year, for example, or the base 18 may be disconnected from the ground surface after removal of the lift rod 16 and then placed in the new desired position for again receiving the lift rod 16). It will be appreciated that other alternative types of removable couplings between the lift rod 16 and the base 18 may be used in other embodiments without departing from the scope of this invention.

Further, in the embodiments depicted in FIGS. 7 and 7A, the base 18 includes a ground mounting stake 70 to be mounted in the ground, which may be removable by pulling the base 18 out of the ground. The ground mounting stake 70 may be used to help secure the accessible lift apparatus 10 to the ground surface. The ground mounting stake 70 comprises a stake rod 72 configured with a helix screw 74 and a stake locking pin 76. The helix screw 74 aids the user in ergonomically screwing the stake rod 72 into the ground and better limiting movement of the stake rod 72 once secured in the ground. The ground mounting stake 70 is coupled to the accessible lift apparatus 10 by engaging the stake locking pin 76 with the base 18 of the accessible lift apparatus 10, which may be a push-pin or bayonet-style connection, or may be any other known connection method for such types of elements. The addition of the ground mounting stake 70 in this embodiment makes it easier for an operator to reliably install and maintain the support provided by the base 18 at a desired location for the accessible lift apparatus 10. Alternatively, the base 18 may be screwed into the ground with threaded connectors (not shown) for installation through the in-ground unit and it may later be released by unscrewing those connectors for relocation purposes.

Figure 8:
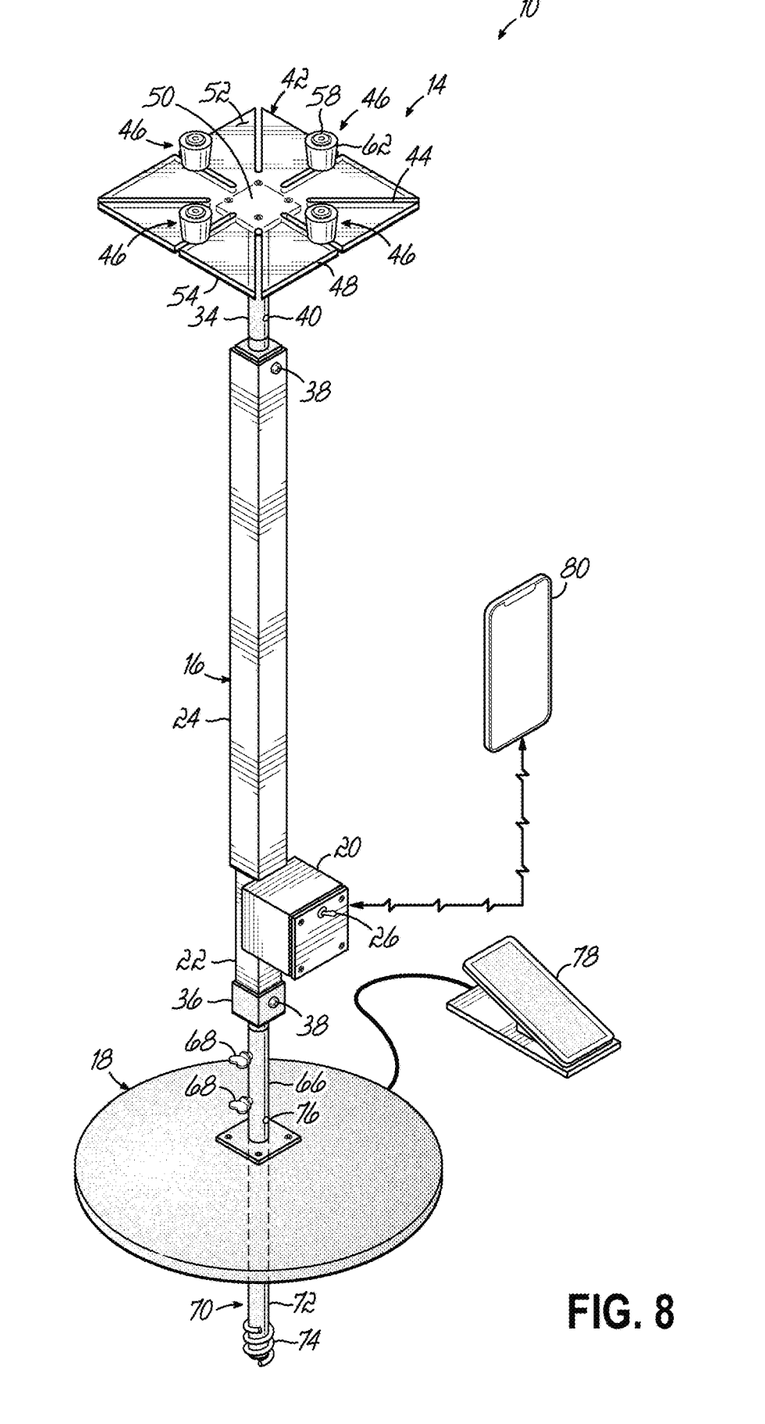
FIG. 8 is a perspective view of another embodiment of an accessible lift apparatus according to this invention, specifically shown in a lowered position.

With reference to FIG. 8, an accessible lift apparatus 10 in accordance with another embodiment of the invention is shown. For the sake of conciseness, only elements that are modified from the prior embodiment in FIGS. 1-7A are described in the following paragraphs, with all other elements maintaining the same reference numbers where essentially unchanged from the prior embodiment(s) described.

The embodiment depicted in FIG. 8 features an accessible lift apparatus 10 with a control box 20 mounted directly to the lift rod 16. The control box 20 is secured toward the lower end of the accessible lift apparatus 10, in a convenient location for all users to reach and manipulate accordingly. Self-contained circuitry connects to the actuator elements and the accessible lift apparatus's 10 lifting system to allow infinite adjustment to the positioning. The control box 20 includes a control switch 26 intended to be operated by hand. Such differs from the embodiment depicted in FIGS. 1-7A, which features the control box 20 and control switch 26 mounted horizontally to a collar plate 30 attached to the lift rod 16 such that the control switch 26 of the control box 20 can be operated by foot, for example.

It is to be understood that the control box 20 may be mounted on alternative locations along the accessible lift apparatus 10 or designed as a remote system as set forth in further detail in examples below. For example, further alternative embodiments of the accessible lift apparatus 10 may include a foot operated switch 78 (e.g., foot pedal) located at or near the base 18 which enables hands-free activation. Still further embodiments may include a remote system that actuates the lift mechanism with a remote controller 80. Hands-free activation is therefore possible and further eases use for elders, disabled users, and children, making the lift apparatus 10 more ergonomic and easier to use for all types of owners/users. The lift rod 16 will stop and start according to the user input from any of these input sources, e.g., from the control box 20, the foot operated switch 78, or the remote controller 80, by activating the lift rod 16 until the desired elevation is reached. When lowering the accessible lift apparatus 10, the user can stop the lift apparatus 10 at the most comfortable/desirable elevation to perform general maintenance on the garden device 12 and mounting plate 14 such as filling a feeder or replacing the mounted garden device 12 with a different garden device 12.

All gardening apparatuses face the risk of weather damage because they are primarily used outdoors. With harsh weather conditions, the lifting system components may experience extreme stresses from wind forces or water infiltration. Additional features such as water resistance sealants or wind adaptative structures may be necessary for users who use the lifting apparatus 10 in harsh climates. Further embodiments can be adaptable to weather variants that could impact the lift apparatus 10. These embodiments include alternative materials, sealants, or size specifications depending upon specific weather needs. Other embodiments can also include control system safety features to accommodate weather conditions.

While the present invention has been illustrated by the description of various embodiments thereof, and while the embodiments have been described in considerable detail, it is not intended to restrict or in any way limit the scope of the appended claims to such detail. Thus, the various features discussed herein may be used alone or in any combination. Additional advantages and modifications will readily appear to those skilled in the art. The invention in its broader aspects is therefore not limited to the specific details and illustrative examples shown and described. Accordingly, departures may be made from such details without departing from the scope of the general inventive concept.

What is claimed is:

1. A lift apparatus for securing a garden device and moving the garden device between a lowered position and a lifted position, the lift apparatus comprising:
    a base configured to be secured in a position on a ground surface;
    a lift rod removably coupled to and extending outwardly away from the base, the lift rod configured to alternatively operate to move the garden device between the lowered position and the lifted position, the lift rod comprising:
        a plurality of telescoping extending shafts arranged in a nested configuration, the plurality of telescoping extending shafts comprising:
            an inner telescoping shaft; and
            an outer telescoping shaft,
            wherein the outer telescoping extending shaft moves linearly relative to the inner telescoping extending shaft when actuated by a drive actuator,
        wherein the lift rod includes a neck rod detachable from a remainder of the lift rod, the neck rod extending away from the remainder of the lift rod at an end of the lift rod opposite of the base and the mounting plate includes a neck rod extending away from a lower surface of the mounting plate, and
        wherein the neck rod of the lift rod is removably coupled to the neck rod of the mounting plate; and
    the drive actuator that alternatively operates to move the plurality of extending shafts between the lowered position and the lifted position,
        wherein the lowered position is an accessible position a user on the ground surface to interact with or adjust the garden device on the mounting plate, and
        wherein the lifted position is a desired mounting or viewing location for the garden device; and
    a universal mounting plate removably coupled to the lift rod at the end of the lift rod opposite of the base, the mounting plate configured to secure the garden device to the mounting plate, the mounting plate comprising:
        a substantially planar support plate defining an upper surface configured to support the garden device;
        a plurality of elongated slots extending through the support plate; and
        a plurality of engagement pins configured to interface with at least some of the plurality of elongated slots,
        wherein each engagement pin of the plurality of engagement pins is moveable so as to be adjustable in position within an elongated slot of the plurality of elongated slots and configured to be repositioned in any of the plurality of elongated slots, and
        wherein the plurality of engagement pins of the mounting plate secure the garden device to the upper surface of the support plate, and
    wherein the base comprises a ground mounting stake removably secured to the base and extending outwardly away from the base in a direction opposite that of the lift rod, the ground mounting stake configured to further secure the base in the position on the ground surface.

2. The lift apparatus of claim 1, wherein the plurality of elongated slots extend inwardly along linear paths from an outer periphery of the support plate towards a center of the support plate.

3. The lift apparatus of claim 1, wherein each engagement pin of the plurality of engagement pins comprises:
    a rigid central pin configured to extend through the elongated slot in the support plate; and
    a spring-loaded clamp configured to be located below the support plate and removably secure the engagement pin in a position on the support plate.

4. The lift apparatus of claim 3, wherein each engagement pin of the plurality of engagement pins further comprises:
    an annular resilient gripping member surrounding a portion of the rigid central pin and configured to project above the upper surface of the support plate to engage with the garden device to removably secure the garden device in a position on the upper surface of the mounting plate.

5. The lift apparatus of claim 1, wherein the drive actuator is operated by a switch, the switch fixed to the lift rod.

6. The lift apparatus of claim 1, wherein the drive actuator is operated by a foot pedal, the foot pedal operatively connected to a collar plate, the collar plate located a distance above the base.

7. The lift apparatus of claim 1, wherein the drive actuator is operated by a remote control.

8. The lift apparatus of claim 1, wherein the neck rod of the lift rod is removably connected to the neck rod of the mounting plate by a push-pin or bayonet-style connection.

9. The lift apparatus of claim 1, wherein the neck rod of the lift rod includes a neck cap that extends over and covers a portion of the lift rod at the end of the lift rod.

10. The lift apparatus of claim 1, wherein the lift rod includes a neck rod extending away from the lift rod at an opposite end of the lift rod and the base includes a rod holder base extending away from the base, and
wherein the neck rod of the lift rod is removably coupled to the rod holder base of the base.

11. The lift apparatus of claim 10, wherein the neck rod of the lift rod is removably connected to the rod holder base by a plurality of locking bolts, a push-pin connection, or a bayonet-style connection.

12. A method for using an accessible lift apparatus to secure a garden device and move the garden device between a lowered position and a lifted position, the method comprising:
providing the lift apparatus, the lift apparatus comprising:
a base configured to be secured in a position on a ground surface;
a lift rod removably coupled with the base and configured to provide linear elevation adjustment between the lowered position and the lifted position, the lift rod comprising:
a plurality of telescoping extending shafts arranged in a nested configuration, the plurality of telescoping extending shafts comprising:
an inner telescoping shaft; and
an outer telescoping shaft,
wherein the outer telescoping extending shaft moves linearly relative to the inner telescoping extending shaft when actuated by a drive actuator,
wherein the lift rod includes a neck rod detachable from a remainder of the lift rod, the neck rod extending away from the remainder of the lift rod at an end of the lift rod opposite of the base; and
the drive actuator that alternatively operates to move the plurality of extending shafts between the lowered position and the lifted position; and
a universal mounting plate removably coupled with the lift rod on the end of the lift rod opposite of the base, the mounting plate including a neck rod extending away from a lower surface of the mounting plate, wherein the neck rod of the lift rod is removably coupled to the neck rod of the mounting plate, the mounting plate configured for securing garden devices of varying size and shape configurations using a plurality of engagement pins;
removably securing the garden device to the mounting plate by moving the engagement pins along the mounting plate and into engagement with the garden device; and
adjusting a height of the mounting plate by extending the lift rod to the lifted position or retracting the lift rod to the lowered position,
wherein the lowered position is an accessible position a user on the ground surface to interact with or adjust the garden device on the mounting plate, and
wherein the lifted position is a desired mounting or viewing location for the garden device.

13. The method of claim 12, wherein the mounting plate comprises:
a substantially planar support plate defining an upper surface and configured to support the garden device; and
a plurality of elongated slots extending through the support plate,
wherein the plurality of engagement pins are inserted into at least some of the plurality of elongated slots, and
wherein the step of removably securing the garden device further comprises adjusting the plurality of engagement pins to abut the garden device.

14. The method of claim 12, wherein the step of adjusting the height of the mounting plate further comprises:
operating the drive actuator by a switch, foot pedal, or remote control configured to operate the drive actuator.

15. The method of claim 12, further comprising:
removably securing the base to the ground surface by a ground mounting stake, the ground mounting stake removably secured to the base and extending outwardly away from the base in a direction opposite that of the lift rod.

16. The method of claim 12, wherein the base extends circumferentially in a plane substantially perpendicular to the lift rod, a cross-sectional dimension of the base greater than a cross-sectional dimension of the universal mounting plate such that the base provides a stable supporting structure when securing the garden device atop the lift apparatus.

17. The method of claim 14, wherein the drive actuator is operated by the switch and the switch is fixed to the lift rod.

18. The lift apparatus of claim 1, wherein a cross-sectional dimension of the neck rod of the inner telescoping shaft or the outer telescoping shaft is different than a cross-sectional dimension of the inner telescoping shaft or the outer telescoping shaft from which the neck rod extends.

19. The lift apparatus of claim 1, wherein the base extends circumferentially in a plane substantially perpendicular to the lift rod, a cross-sectional dimension of the base greater than a cross-sectional dimension of the universal mounting plate such that the base provides a stable supporting structure when securing the garden device atop the lift apparatus.

* * * * *